No. 879,496. PATENTED FEB. 18, 1908.
E. H. RYON.
WORM DRIVING MECHANISM.
APPLICATION FILED OCT. 7, 1907.
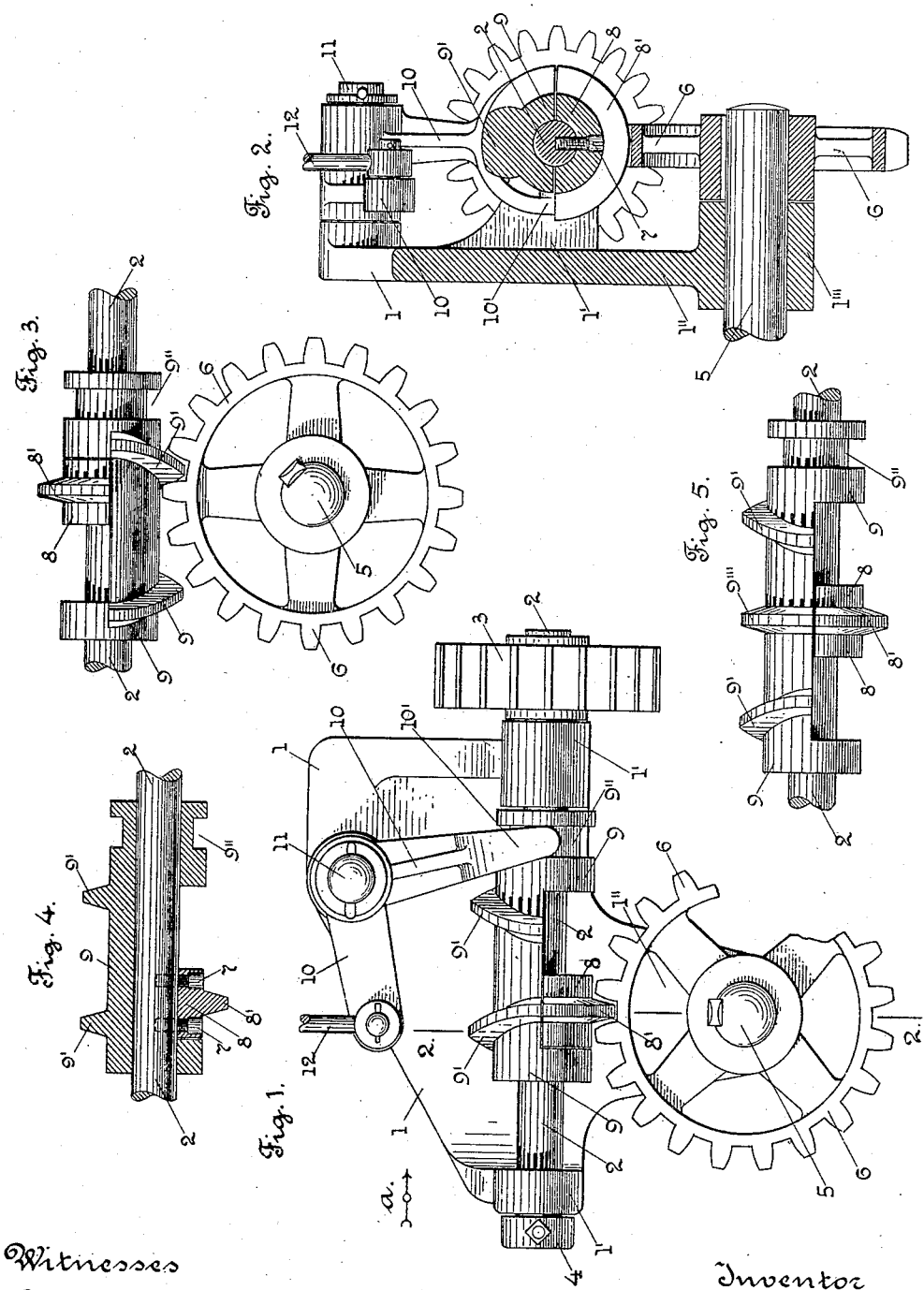
Witnesses
M. Bredt.
M. Caas.
Inventor
Eppa H. Ryon.
By John C. Dewey
Attorney.

UNITED STATES PATENT OFFICE.

EPPA H. RYON, OF WORCESTER, MASSACHUSETTS, ASSIGNOR TO CROMPTON & KNOWLES LOOM WORKS, A CORPORATION OF MASSACHUSETTS.

WORM-DRIVING MECHANISM.

No. 879,496.  Specification of Letters Patent.  Patented Feb. 18, 1908.

Application filed October 7, 1907. Serial No. 396,172.

*To all whom it may concern:*

Be it known that I, EPPA H. RYON, a citizen of the United States, residing at Worcester, in the county of Worcester and State of Massachusetts, have invented certain new and useful Improvements in Worm-Driving Mechanism, of which the following is a specification.

My invention relates to worm driving mechanism, and more particularly to mechanism for rotating a worm gear on a shaft, to turn said worm gear in either direction, without reversing the direction of movement of my worm driving mechanism.

The object of my invention is to provide an improved worm driving mechanism of simple construction and operation, and which may be readily applied to, and used in connection with any well known mechanism having worm gear as a part thereof, to be rotated in either direction.

My invention consists in certain novel features of construction of my improvements as will be hereinafter fully described.

Referring to the drawings:—Figure 1 is a front view of my worm driving mechanism, and parts connected therewith. Fig. 2 is a section, on line 2, 2, Fig. 1, looking in the direction of arrow $a$, same figure. Fig. 3 shows the opposite position of the worm driving mechanism shown in Fig. 1. Fig. 4 is a cross section through the worm driving mechanism, and, Fig. 5 shows a modified construction of my worm driving mechanims.

In the accompanying drawing, 1 is a stationary stand having bearings 1' in which is mounted, in this instance a rotary shaft 2, having a driven pinion 3 fast on one end thereof, and a collar 4 fast on the other end thereof. On a downward extension 1'' on the stand 1, is in this instance a bearing 1''' for a rotary shaft 5, having fast thereon a worm gear 6.

I will now describe my improvements in worm driving mechanism.

On the shaft 2 is secured, in this instance by screws 7, see Fig. 4, a segment or detached portion 8 of a worm, having a straight tooth or dwell portion 8' thereon. Loosely mounted on the shaft 2 and adapted to move longitudinally thereon is a sleeve 9, having thereon in this instance two worm thread or tooth portions 9', a right hand, and a left hand, and each one adapted to be moved into line with the straight tooth 8' on the worm portion 8 fast on the shaft 2, see Fig. 1, to form one complete worm thread, either a right hand thread, or a left hand thread. The sleeve 9 has in this instance at one end an annular groove 9'' therein, to receive the yoke shaped lower end 10' of an angle lever 10, pivotally mounted on a stud 11 fast on the stand 1. The other arm of the angle lever 10 is pivoted to the lower end of a rod or connector 12, leading to mechanism, not shown, for moving the angle lever 10 at regular intervals, or at predetermined times, to communicate a longitudinal movement to the sleeve 9 on the shaft 2.

The operation of my worm driving mechanism will be readily understood by those skilled in the art. The worm gear 6, fast on the shaft 5, is rotated in either direction, according to the longitudinal position of the sleeve 9, and the engagement of the right hand worm thread portion 9', or the left hand worm thread portion 9', with the straight tooth portion 8' on the part 8 fast on the shaft 2.

In Fig. 5 is shown a modified construction of my worm driving mechanism. In said figure the sleeve 9 is made longer and has thereon, intermediate the right hand worm thread portion 9' and the left hand thread worm portion 9', a third straight tooth portion 9''', which is adapted to be moved into line with the straight tooth portion 8' on the worm thread portion 8, as shown in Fig. 5, so that the revolution of the shaft 2 and the worm portion 8 fast thereon, when the straight tooth portion 8' is in line with the straight tooth portion 9''', will cause a dwell of the worm gear 6 and hold said worm gear stationary.

It will be understood that the details of construction of my improvements may be varied if desired. The sleeve 9 may have only one right or left hand thread portion 9' thereon, and the straight portion 9''' thereon to cause the worm gear 6 to rotate in one direction only, or remain stationary.

Having thus described my invention, what I claim as new and desire to secure by Letters Patent is:—

1. The combination with a rotary shaft, and a tooth or thread portion fast on said shaft, of a sleeve loose on said shaft, and having thereon two worm thread portions, a right hand, and a left hand, each one to be moved into line with the tooth or thread portion fast on the shaft, to form a complete worm thread, either a right hand thread, or a left hand thread.

2. The combination with a rotary shaft, and a tooth or thread portion fast on said shaft, of a sleeve loose on said shaft, and having thereon two worm thread portions, a right hand, and a left hand, each one to be moved into line with the tooth or thread portion fast on the shaft, to form a complete worm thread, either a right hand thread, or a left hand thread, and also having thereon a straight tooth or thread portion to be moved into line with the tooth or thread portion fast on the shaft to form a complete straight thread.

3. In combination, a rotary shaft, a thread portion fast thereon, a sleeve having thread portions thereon loose on said shaft, a worm gear adapted to mesh with said thread portions and be rotated or held stationary by said thread portions.

4. In combination, a rotary shaft, a thread portion fast thereon, a sleeve having thread portions thereon loose on said shaft, a worm gear adapted to mesh with said thread portions and be rotated in either direction or held stationary by said thread portions.

EPPA H. RYON.

Witnesses:
J. C. DEWEY,
M. HAAS.